(12) United States Patent
Fort et al.

(10) Patent No.: US 6,896,543 B2
(45) Date of Patent: May 24, 2005

(54) SECURE MOUNTING ASSEMBLY FOR A RETAIL PRODUCT DISPLAY

(75) Inventors: Calvin L. Fort, Franklin, WI (US); Paul C. Burke, Lake Forest, IL (US)

(73) Assignee: Telefonix, Inc., Waukegan, IL (US)

( * ) Notice: Subject to any disclaimer, the term of this patent is extended or adjusted under 35 U.S.C. 154(b) by 0 days.

(21) Appl. No.: 10/847,820

(22) Filed: May 18, 2004

(65) Prior Publication Data

US 2004/0229498 A1 Nov. 18, 2004

Related U.S. Application Data

(63) Continuation of application No. 09/872,230, filed on Jun. 1, 2001, now Pat. No. 6,761,579, which is a continuation-in-part of application No. 09/039,825, filed on Mar. 16, 1998, now Pat. No. 6,386,906.

(51) Int. Cl.$^7$ .............................................. H01R 13/72
(52) U.S. Cl. ..................... 439/501; 439/527; 340/568.1
(58) Field of Search ................................ 439/527, 501; 340/568.1–568.9, 693.1–693.13

(56) References Cited

U.S. PATENT DOCUMENTS

| | | | |
|---|---|---|---|
| 4,455,464 A | 6/1984 | Leyden | |
| 4,620,182 A | 10/1986 | Keifer | |
| 4,736,826 A | 4/1988 | White et al. | |
| 4,772,878 A | 9/1988 | Kane | |
| 5,003,292 A | 3/1991 | Harding et al. | |
| 5,072,213 A | 12/1991 | Close | |
| 5,094,396 A | 3/1992 | Burke | |
| 5,124,685 A | * 6/1992 | Rankin | 340/568.2 |
| 5,146,205 A | 9/1992 | Keifer et al. | |
| 5,172,098 A | 12/1992 | Leyden et al. | |
| D335,439 S | 5/1993 | Leyden et al. | |
| 5,289,559 A | 2/1994 | Wilson | |
| D345,092 S | 3/1994 | Leyden et al. | |
| 5,341,124 A | 8/1994 | Leyden | |
| 5,421,667 A | 6/1995 | Leyden et al. | |
| 5,467,075 A | 11/1995 | Rand | |
| 5,543,782 A | 8/1996 | Rothbaum et al. | |
| 5,552,771 A | 9/1996 | Leyden | |
| 5,565,848 A | 10/1996 | Leyden et al. | |
| 5,570,080 A | 10/1996 | Inoue et al. | |
| 5,577,855 A | 11/1996 | Leyden et al. | |
| 5,699,591 A | 12/1997 | Kane | |
| 5,726,627 A | 3/1998 | Kane | |
| 5,821,857 A | 10/1998 | Rand | |
| 5,861,807 A | 1/1999 | Leyden | |
| 5,936,525 A | 8/1999 | Leyden et al. | |
| 6,027,277 A | 2/2000 | Leyden et al. | |
| 6,039,498 A | 3/2000 | Leyden et al. | |
| 6,087,939 A | 7/2000 | Leyden et al. | |
| 6,104,289 A | 8/2000 | Rand | |
| 6,147,603 A | 11/2000 | Rand | |
| 6,476,717 B1 | * 11/2002 | Gross et al. | 340/568.1 |

FOREIGN PATENT DOCUMENTS

| | | |
|---|---|---|
| JP | 9054882 | 2/1997 |
| WO | 17393 | 2/2000 |
| WO | 23073 | 4/2000 |

\* cited by examiner

Primary Examiner—Lincoln Donovan
(74) Attorney, Agent, or Firm—Hanley, Flight & Zimmerman, LLC

(57) ABSTRACT

Mounting assemblies for product display and security are described herein. An example mounting assembly includes a first portion, a second portion, a fastener, and an electrical connector. The first portion is configured to carry a sensor and the second portion defines a cavity to provide passage to a first cable assembly. The electrical connector is configured to electrically couple the first cable assembly to a second cable assembly from a plurality of cable assemblies associated with the plurality of electronic devices. Two or more of the plurality of cable assemblies include different connector types. The second cable assembly includes a first connector type configured to be electrically coupled to the connector associated with the first portion, and a second connector type configured to be electrically coupled to the one of the plurality of electronic devices.

6 Claims, 4 Drawing Sheets

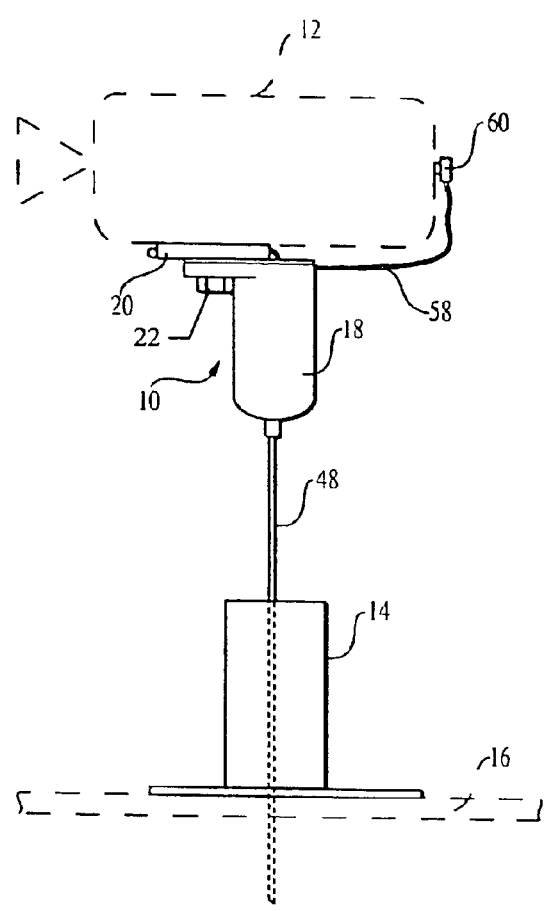
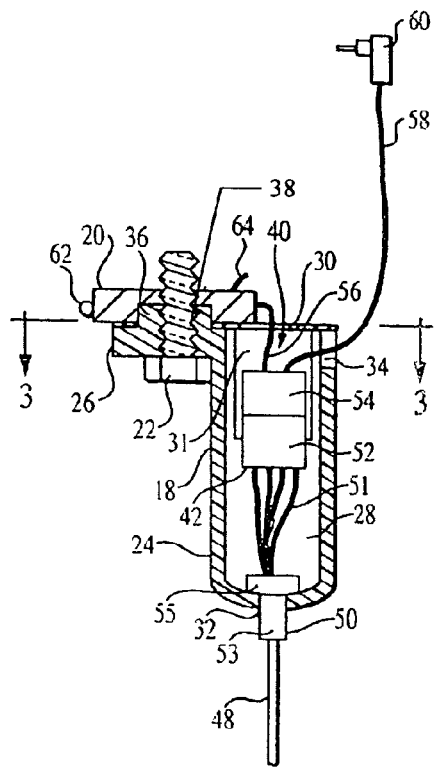
FIG. 1
FIG. 2
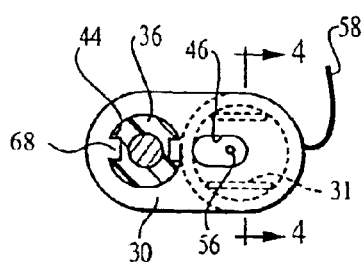
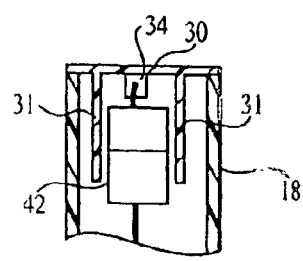
FIG. 3
FIG. 4

SECURE MOUNTING ASSEMBLY FOR A RETAIL PRODUCT DISPLAY

RELATED APPLICATIONS

This application is a continuation of application Ser. No. 09/872,230, filed Jun. 1, 2001, now U.S. Pat. No. 6,761,579 which is a continuation-in-part of U.S. patent application Ser. No. 09/039,825, filed Mar. 16, 1998 and issued as U.S. Pat. No. 6,386,906.

TECHNICAL FIELD

The present disclosure relates to mounting assembly systems for products such as cameras and the like. More particularly, the present disclosure relates to cable management assemblies and mounting devices for electronic products.

BACKGROUND

Cameras, camcorders (e.g., video cameras), and other electronic products are commonly sold in retail stores such as, for example, small electronic boutique shops, mass merchandisers, department stores, and discount/outlet stores. The cameras or other products are commonly installed in an operating condition on display tables and/or counters so that consumers may pick up various products to examine and/or test them. Theft is a constant concern, particularly for larger stores. To combat this problem, security systems have been developed. Existing security systems typically include an electronic alarm module and a plurality of sensors. For example, a sensor may be attached to each product, e.g., a camera, for which protection is desired, and the alarm module may monitor each sensor. If a sensor status changes because the sensor is removed from the product, a cable is cut or as a result of other tampering, an alarm is sounded.

There are many patents disclosing security systems including the following:

| U.S. Pat. No. | Date | Inventors |
| --- | --- | --- |
| 5,172,098 | Dec. 15, 1992 | Leyden et al. |
| 5,543,782 | Aug. 6, 1996 | Rothbaum et al. |
| 5,552,771 | Sep. 3, 1996 | Leyden et al. |
| 5,726,627 | Mar. 10, 1998 | Kane |
| 5,821,857 | Oct. 13, 1998 | Kane |

The foregoing patents are hereby incorporated by reference.

Thieves have sought to bypass existing security systems in several ways. For example, thieves may intentionally trip the alarm system with feigned innocence one or more times. In most alarm systems, the sensors are hardwired to the security system. The wiring includes one or more electrical connectors that facilitate connection of the sensors to the electronic devices. Thieves have been known to unplug electrical connectors, which does not damage the product or system, but interrupts the security circuit and triggers the alarm. When the alarm is activated, store personnel will locate the unplugged connector, admonish the apparent customer, and reset the system. One or more thieves acting in concert have been known to repeatedly trip such a security system. The repeated alarms frustrate store personnel causing them to disable the security system or passively act in response to new alarm events. Once this environment has been created, the thieves will cut one or more electronic devices free from the display table and abscond with surprising quickness.

Another problem in the retail industry involves securely mounting sensors to products in a manner that does not damage the product but which is also tamper resistant. A commonly used sensor is a plunger-type switch that is attached to the electronic device or other product so that when installed on a product, the plunger is depressed, thereby closing or completing the sensor circuit. If the sensor is removed from the product, the plunger extends to open the circuit and trigger an alarm. The sensor is typically attached to the product with an adhesive or a mechanical fastener. Drawbacks of such a system include damage to the product caused by the adhesive or fastener. Thieves may remove the sensor from the product, with feigned innocence, triggering false alarms as noted above.

Further, significant development effort has been directed toward displaying products in an attractive manner that is conductive to sale. For example, it is desirable to mount cameras, camcorders, and other electronic devices on a shroud, which elevates the product and places it in an operative position. Further, it is desirable to minimize the appearance of security systems without sacrificing functionality. However, many existing security systems are obtrusive and interfere with the handling and testing of the products by customers.

BRIEF DESCRIPTION OF THE DRAWINGS

FIG. 1 depicts an elevational view of an example security assembly attached to a product.

FIG. 2 depicts a vertical cross-section of a portion of the example security assembly of FIG. 1.

FIG. 3 depicts a horizontal cross-section taken along line 3—3 of FIG. 2.

FIG. 4 depicts a horizontal cross-section taken along line 4—4 of FIG. 3.

DETAILED DESCRIPTION

Figure 5:
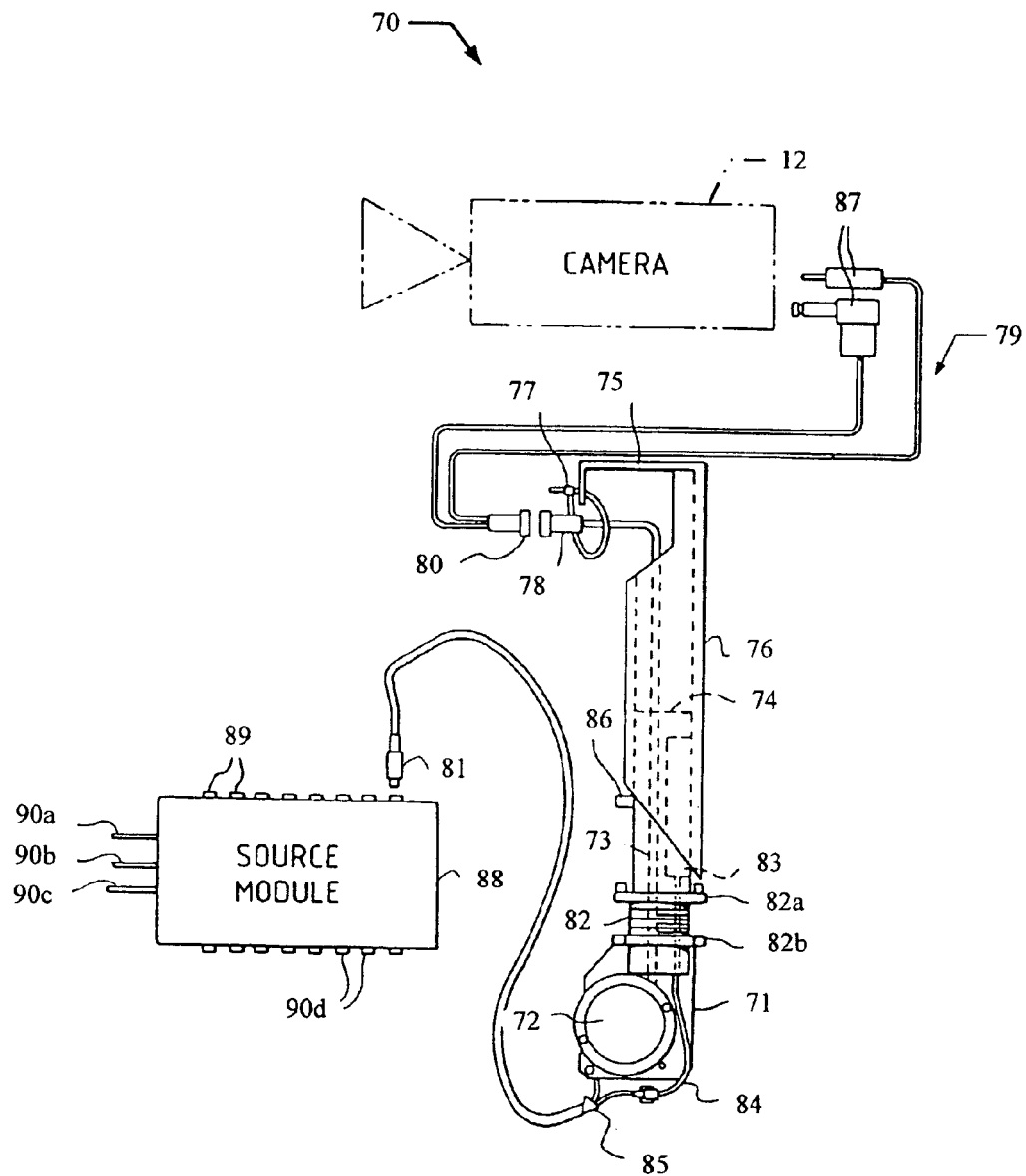
FIG. 5 depicts an example mounting member assembly configured to support a base member.

Turning now to the drawings, FIGS. 1–4 illustrate an example security assembly 10. The security assembly 10 is attached to a product 12 such as, for example, a camera, a camcorder, etc., which has been lifted out of base unit comprising a tubular holder 14. The holder 14 is attached to a product display table, surface or counter 16.

The security assembly 10 comprises a shroud 18, a security sensor 20, and a fastener 22. The shroud 18 may include a lower pedestal portion 24, a mounting flange 26, an interior cavity 28, a cover plate 30, and cable passageways 32 and 34. The pedestal 24 is adapted to be received in the holder 14.

For example, the sensor 20 may be a conventional, doughnut-shaped sensor. Sensors of this type have been in use for many years and are well known to those skilled in the art. The flange portion 26 of the shroud 18 preferably includes a sensor seat 36 comprising a post that extends into a recess or hole within the sensor 20. A bore 38 extends through the post 36 and the flange portion 26. The fastener 22 passes through the bore 38. The post 36 may be shorter than the thickness of the sensor 20 so that the fastener 22 may clamp the sensor 20 between the shroud 18 and the product 12.

In one embodiment, the sensor seat 36 is shown as a post that fits into an opening in the sensor 20. However, it should be understood that the seat 36 could have other configurations. For example, the seat 36 could be cup-shaped to receive all or a portion of the sensor 20 within the seat 36. Also, the sensor 20 and retaining members (e.g., retaining member 36 described in detail below) may be round. However, it should be understood that other shapes, e.g., a polygonal shape, could be used instead. In general, the seat 36 performs the function of retaining the sensor 20 so that the shroud 18 and the sensor 20 may be attached to the product 12.

The fastener 22 may be a conventional bolt having threads to mate with the product 12. Of course, other types of fasteners could be used instead.

The shroud 18 has an open top, indicated generally at 40, through which an electrical connector 42 may be inserted into and enclosed within a cavity 28. The opening 40 is covered by a cover plate 30 to limit access to the connector 42. Other means may be used to cover the opening 40. For example, the sensor 20 could be positioned to substantially cover the opening 40, or the shroud 18 may be fastened to the product 12 in such a manner that a portion of the product 12 covers the opening 40. The mechanism or means for covering the opening 40 is not important as long as access to the connector 42 is limited. Other suitable types of covers could be used instead.

The preferred cover plate 30 includes two holes generally shown as a first hole 44 and a second hole 46. The first hole 44 is designed to receive the sensor seat 36. The cover plate 30 includes one or more keys 68 that mate with one or more corresponding keyways in the sensor seat 36. The keys 68 prevent rotation of the cover plate 30 relative to the shroud 18, which could expose the opening 40. Opening 46 provides a passageway for a sensor cable assembly 56. When the security assembly 10 is installed on a product, a significant portion of opening 46 is covered by the sensor 20, thereby limiting access to the connector 42.

A cable assembly portion 48 extends from a source (not shown) through the holder 14 and into the shroud 18. The cable assembly portion 48 preferably enters through a passageway 32 at the bottom of the bottom of the pedestal portion 24. A grommet 50 molded of an elastomeric material is provided in the opening 32 and over the cable assembly portion 48 to protect the connection point from fatigue failure. A preferred cable construction comprises an outer jacket of braided nylon or other textile. The grommet 50 is desirably placed over an end of the braided jacket and then the jacket is braided back over the grommet 50 to firmly secure the grommet 50 and jacket together. As a result, stress applied to the grommet 50 is transferred to the braided nylon jacket and not to the conductors, thereby increasing the life cycle of the cable assembly portion 48.

The grommet 50 comprises a base portion 53 and a head portion 55. The base portion 53 is removably held in the opening 32. The head portion 55 of the grommet 50 is substantially larger than the opening 32 to prevent the grommet 50 from being pulled through the opening 32. The opening 32 is larger than the diameter of the cable assembly portion 48 and is slightly larger than the base portion 53 of the grommet 50. Accordingly, the shroud 18 may be slid downwardly on the cable assembly portion 48 so that the connectors 42 may be removed from the cavity 28.

Conductors 51 that comprise the cable assembly portion 48 are connected to one end 52 of the electrical connectors 42. The connectors 42 may be of any type. Suitable connectors are well known to persons skilled in the art. Another cable assembly portion 56 electrically coupled to the sensor 20 is connected to the other end 54 of the connectors 42. Optionally, a power cable 58 may be connected to the connector 54. Although the connector 54 is shown as a single connector, the connector 54 may be split to include two or more connectors so that the power cable 58 is independent of the sensor cable assembly 56. The power cable 58 carries a plug 60 adapted for connection with a corresponding jack on the product 12. Further, it should be appreciated that it is not strictly necessary to run both the security circuit and power through the connectors 42. In some cases it may be desirable to configure the cable assembly portion 56 to be unitary and integral with the cable assembly portion 48.

The cable assembly portion 48 is connected to a security system and/or circuit (not shown). As is well known in the art, the security system and/or circuit connected to the sensor 20 monitors the product 12. If the sensor 20 is removed from the product 12 or if the cable assembly portion 48 is cut, an alarm is sounded. The cable assembly portion 48 preferably carries power for the product 12 in addition to the security system and/or circuit. The cable assembly portion 48 may carry one or more power voltages. In U.S. Pat. No. 6,386,906, an electrical adapter carries plural signals, including plural power voltages, as may be required by different cameras or other products. The disclosure of U.S. Pat. No. 6,386,906 is hereby incorporated by reference herein in its entirety. If the cable assembly portion 48 is configured to carry plural voltages, then the connector 54 is configured (e.g., pinned) to pick up a selected voltage for the desired product. Likewise, the plug 60 is selectively configured for the desired product. Thus, the security assembly 10 may be generic for various products (e.g., cameras, camcorders, etc.) requiring different supply voltages and/or connections. The power cable 58 with associated the connector 54 and the plug 60 may be selected for each particular product type, model, etc.

Further, the security assembly 10 may include an anti-rotation device associated with the connector 42 as shown in FIG. 3. Rotation of the connector 42 can fatigue the cable conductor 42 and result in cable failure. One form of an anti-rotation device suitable for rectangular connectors is shown in FIGS. 2–4. The anti-rotation device comprises wings 31 on either side of the connector 42. The wings 31 can be integrally formed with the cover 30.

The sensor 20 typically includes a light emitting diode 62 and a plunger 64, which is mechanically linked to a switch (not shown) within the sensor 20. Although the security assembly 10 is particularly well suited for use with a doughnut configuration, plunger-switch type of sensor, the methods, apparatus, and systems disclosed herein may be applied to other types of sensors.

As indicated above, the member or shroud 18 is preferably in the form of a shroud having a downwardly extending pedestal portion 24. However, this shape is not strictly necessary. For some products or store display systems, a pedestal or other shape may not be appropriate. Further, although the flange 26 is shown for facilitating fastening of the shroud 18 to the product 12, a flange is not strictly required and other structures for receiving a fastener (e.g., the fastener 22) may be employed. For example, the shroud 18 could be configured to receive the fastener 22 centrally though the cavity 28. It should be understood that the methods, apparatus, and systems disclosed herein are not limited to any particular shape or configuration of the member 18. The member 18 may be fabricated from any material such as molded plastic, metal, etc.

As noted above, electronic devices such as cameras, camcorders, etc. are often displayed in an operative manner to allow for demonstration. This manner of display allows for the devices to be picked up and used by potential customers. Handheld video cameras, for example, will often be placed along a counter in operative mode to be picked up and brought to a potential customer's eye for demonstration. This type of retail display and demonstration of video cameras and the like can be demanding. For the camera to be operable, it must be connected to several signal sources. Multiple individual cables are necessary to make these electrical connections to remote power and other input/output signal sources. Also, insuring that the displayed products or devices are not stolen may require an additional cable. The presence of so many cables can lead to a disorganized, irregular, and/or haphazard appearance, which is a quality that does not lend itself to customer confidence.

Further, as the displayed products or devices are removed from their display positions and moved about as they are tested and demonstrated by potential customers, the various cables connected to it need to be extended and subsequently retracted as the device is returned from use. If they are not extended and retracted in an effective manner, the cables will tend to knot and tangle and render movement (and hence the demonstration of) the camera difficult or impossible.

The task of managing and organizing the required cables and connections is made even more difficult as retail displays of cameras and the like typically include several different devices manufactured by different manufacturers. Typically, for example, an electronics retailer may display 10 or more different video cameras for sale. These different cameras may each utilize different types of connectors, meaning that each will require entirely different cables and connection jacks. As a result, spares of each of the many individual cables and jacks must also be kept on hand in case of failure. If spares are not kept, the failure of a cable or jack will render a demonstration unit inoperable. Maintaining this large number of spares adds expense for the retailer.

Likewise, each time a product is installed or moved from one display location to another, all of its associated individual cables must likewise be installed or moved. Because of their individual requirements, the task of installing, maintaining, and moving the displayed products is not straightforward and may require the attention of a skilled technician, further adding to associated costs.

Also, it would be advantageous to have an indication of when a potential customer picks up a camera. For example, for marketing purposes, an audio tape highlighting features of a particular product may be triggered and played when a customer begins handling the product. With this information marketers can also determine which displayed products were most or least appealing to potential customers. For maintenance and security purposes, one could record when and for how long a particular product was in use. Also, should a displayed product be vandalized or stolen, having a record of when it was in use could be valuable in identifying and apprehending suspects.

Figure 6:
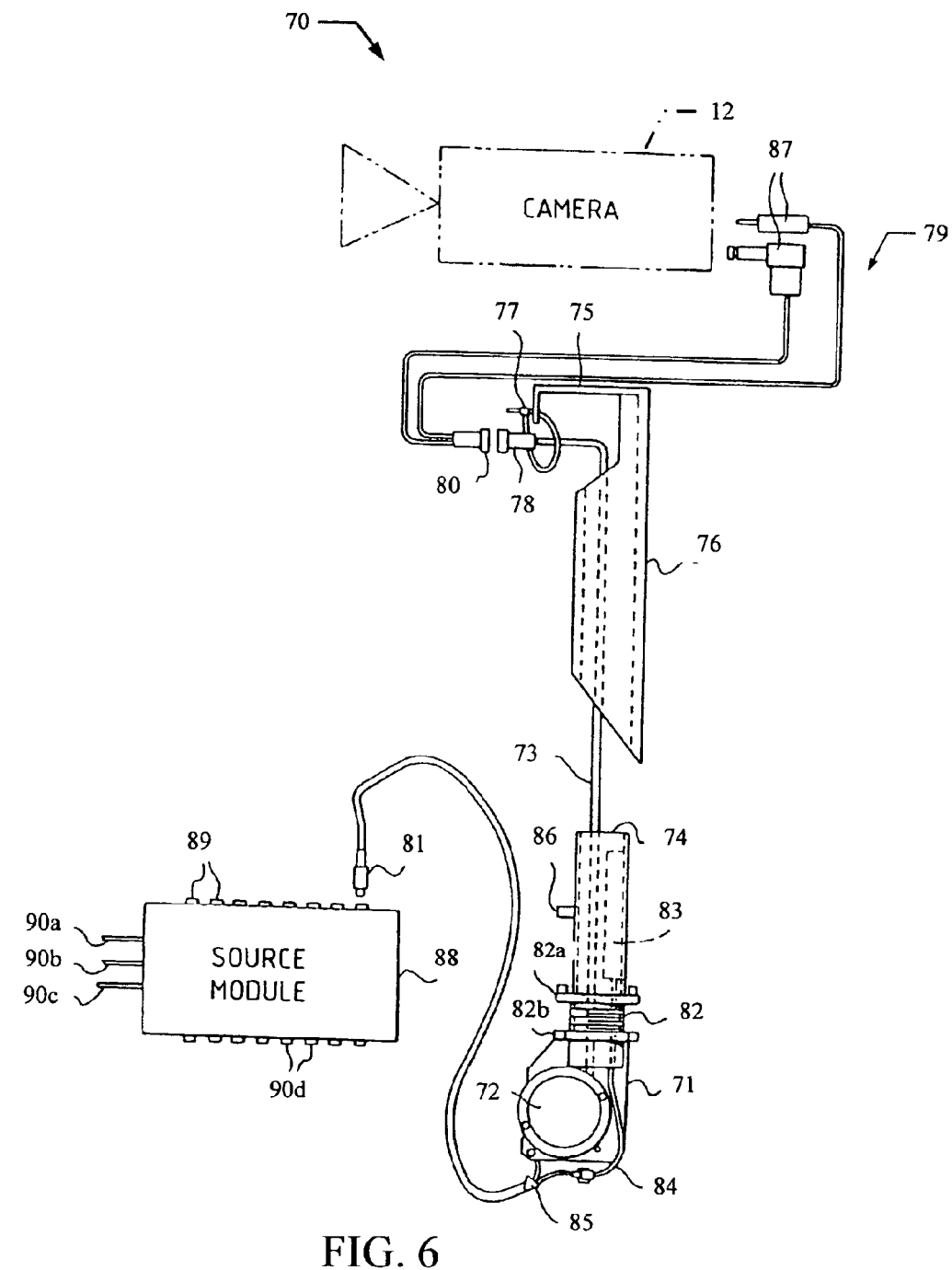
FIG. 6 depicts the example mounting assembly of FIG. 5 removed from the base member.

FIGS. 5 and 6 depict an example mounting assembly 70 for mounting the product 12 such as, for example, a camera, a camcorder, etc. to a display rack. In particular, FIG. 5 depicts a mounting member 75 disposed in a base member 71, and FIG. 6 depicts the mounting member 75 removed from the base member 71.

The base member 71 includes a cord reel 72 retractably storing a portion of cable assembly 73. For example, the cord reel 72 may be constructed in accordance with the teachings of U.S. Pat. No. 5,094,396, the disclosure of which is hereby incorporated by reference herein in its entirety. However, the cord reel 72 may not include a ratchet mechanism.

Further, the base member 71 includes a hollow tubular arm 74 through which the cable assembly 73 passes. The mounting member 75 includes a tubular portion 76, which cooperates with the base member tubular arm 74 to removably hold the mounting member 75. A pin 86 fixes the height at which the mounting member 75 is held on the base member arm 74. The cable assembly 73 passes through the mounting member tubular portion 76, and is mechanically connected to the mounting member 75 by a tie wrap 77. As the mounting member 75 with the product 12 attached is removed from the base member arm 74 and moved about by prospective customers, the cable assembly 73 will be automatically and conveniently extended and retracted via the cord reel 72.

Although a base member tubular arm portion 74 and a cooperating mounting member tubular portion 76 are described above to removably attach the mounting portion 75 to the base portion 71, other means of removably fastening the mounting portion 75 to the base portion 71 may be used instead.

The cable assembly 73 comprises several conductors including video, plural DC power supplies, and a security circuit. In this manner, the cable assembly 73 replaces several individual cables previously required for displaying the product 12. The security circuit of the cable assembly 73 comprises an electronic circuit which will be opened or otherwise triggered if the cable assembly 73 is cut or disconnected, as would occur during a shoplifting attempt. If the security circuit is opened or triggered, an alarm will automatically sound.

Figure 7:
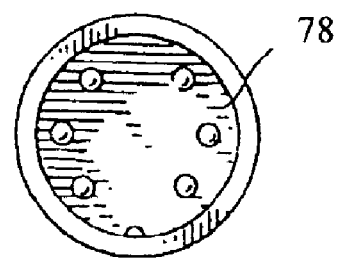
FIG. 7 depicts an example connector associated with the example mounting assembly of FIGS. 5 and 6.

FIG. 7 depicts a six-conductor connector 78 at the second end of the cable assembly 73 for connection to a modular adapter 79. Two of the six conductors carry the video signal and a security circuit. One of the six conductors is a neutral or ground conductor. The remaining three conductors carry 3.6 V, 6 V, and 9 V, respectively, as different products may require different ones of these voltages. Although the connector 78 is depicted in FIG. 7 to include six conductors, a connector utilizing fewer or more conductors could easily be substituted as required.

The modular adapter 79 has a connector 80 at its first end cooperating with the cable connector 78, and a plurality of connectors 87 at its second end for connection to the product 12. The plurality of connectors 87 are configured as required for the product 12 which may, for example, be a camera, an electronic device or other products. If the product 12 is to be replaced with a different product having different connection requirements, an alternate modular adapter 79 can be used. In this manner only the adapter 79 needs to be changed, and the cable assembly 73 need not be changed when a product is replaced, thereby greatly reducing the time and effort required for moving different products amongst displays.

Figure 8:
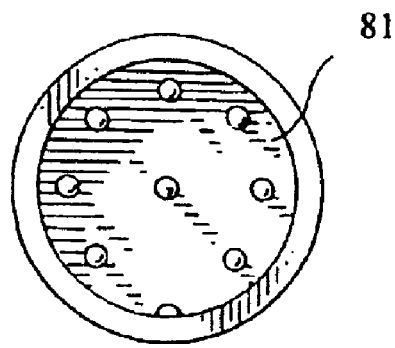
FIG. 8 depicts another example connector associated with the example mounting assembly of FIGS. 5 and 6.

FIG. 8 depicts an eight-conductor connector 81 located at the first end of the cable assembly 73 to connect to a source module 88 configured to receive and transmit input and output source signals. For example, six of the eight conductors are the same as the conductors described in connection with FIG. 7, with the remaining two conductors carrying a circuit for a light sensor 83. Although the connector 81 comprises eight conductors, a connector utilizing more or fewer, conductors could easily be substituted as required. The source module 88 may be equipped to provide multi-conductor input and output connections 89 for a plurality of individual cable management apparatuses. Also, the source module 88 may be wired to carry various input and output signals as required.

For example, the source module 88 may carry a plurality of power signals (e.g., 3.6 V, 6.0 V and 9.0 V), an anti-theft circuit, a light detector circuit, and a video circuit. The source module 88 is also configured to provide various output connections to carry signals to other devices; a connector set 90*d* for carrying video to monitors, a connector 90*a* for carrying security to a security system, a connector 90*b* for carrying an electric eye circuit, and a connector 90*c* for power input. The source module 88 may be designed and constructed to provide these connections in known manners.

The example mounting assembly in FIGS. 5 and 6 also includes a detecting means 83 for detecting the presence/absence of the mounting member 75. For example, the detecting means 83 may be a light sensor which will be activated by the presence of ambient light when the tubular portion 76 of the mounting member 75 is removed from base member arm 74, and deactivated when the tubular portion 76 is present and thereby covering the light sensor 83. The sensor input/output signals are carried in a cable 84 that joins the cable assembly 73 at a breakout connector 85. The connector 81 connects the detecting means signal with its input/output source.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A mounting assembly comprising:

a first portion and a second portion, the first portion being configured to carry a sensor, and the second portion defining a cavity to provide passage to a first cable assembly;

a fastener configured to couple the first portion to one of a plurality of electronic devices through at least one of a passage of the first portion and a passage of the sensor; and an electrical connector associated with the first portion, wherein the electrical connector is configured to electrically couple the first cable assembly to a second cable assembly from a plurality of cable assemblies associated with the plurality of electronic devices, wherein two or more of the plurality of cable assemblies include different connector types, and wherein the second cable assembly includes a first connector type configured to be electrically coupled to the connector associated with the first portion, and a second connector type configured to be electrically coupled to the one of the plurality of electronic devices.

2. A mounting assembly as defined in claim 1 further comprising a reel configured to retractably store at least a portion of a length of the first cable assembly.

3. A mounting assembly as defined in claim 1 further comprising a holder coupled to a surface and configured to carry at least one of a portion of the second portion and a portion of the first cable assembly.

4. A mounting assembly as defined in claim 1, wherein at least one of the first and second cable assemblies comprises a plurality of cables.

5. A mounting assembly as defined in claim 1, wherein the first cable assembly comprises at least one of a sensor cable, an audio cable, a video cable, and a power cable.

6. A mounting assembly as defined in claim 1, wherein the plurality of electronic devices comprises one of a camera and a video camcorder.

* * * * *